(12) United States Patent
Border et al.

(10) Patent No.: US 7,756,330 B2
(45) Date of Patent: Jul. 13, 2010

(54) PRODUCING AN EXTENDED DYNAMIC RANGE DIGITAL IMAGE

(75) Inventors: John N. Border, Walworth, NY (US); Efrain O. Morales, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 892 days.

(21) Appl. No.: 11/460,364

(22) Filed: Jul. 27, 2006

(65) Prior Publication Data
US 2008/0025634 A1    Jan. 31, 2008

(51) Int. Cl.
G06K 9/00 (2006.01)
G03F 3/08 (2006.01)
H04N 5/235 (2006.01)
(52) U.S. Cl. .................. 382/167; 358/518; 358/523; 348/222.1; 348/229.1
(58) Field of Classification Search .................. 382/167; 358/518–523; 348/222.1, 229.1
See application file for complete search history.

(56) References Cited

U.S. PATENT DOCUMENTS

| 3,971,065 | A | 7/1976 | Bayer | |
|---|---|---|---|---|
| 5,235,434 | A * | 8/1993 | Wober | 358/448 |
| 5,237,431 | A * | 8/1993 | Imoto | 358/445 |
| 5,652,621 | A | 7/1997 | Adams, Jr. et al. | |
| 5,870,505 | A | 2/1999 | Wober et al. | |
| 6,040,858 | A | 3/2000 | Ikeda | |
| 6,864,916 | B1 | 3/2005 | Nayar et al. | |
| 6,943,831 | B2 | 9/2005 | Gallagher et al. | |
| 2003/0117412 | A1 | 6/2003 | Brooksby et al. | |
| 2005/0013503 | A1 * | 1/2005 | Park et al. | 382/254 |
| 2005/0103977 | A1 | 5/2005 | Krymski | |
| 2008/0259181 | A1 * | 10/2008 | Yamashita et al. | 348/229.1 |

* cited by examiner

*Primary Examiner*—Vikkram Bali
*Assistant Examiner*—Randolph Chu
(74) *Attorney, Agent, or Firm*—Raymond L. Owens

(57) ABSTRACT

A method of producing a digital image with extended dynamic range, includes capturing at least a first full resolution digital image of a scene; combining pixels of a first full resolution digital image to produce a lower resolution digital image identifying dark regions in a first full resolution digital image and replacing the dark regions in the full resolution image with corresponding regions from the brighter, lower resolution image to thereby provide a digital image with extended dynamic range.

6 Claims, 5 Drawing Sheets

| G | B | G | B | G | B | G | B | G | B | G |
|---|---|---|---|---|---|---|---|---|---|---|
| R | G | R | G | R | G | R | G | R | G | R |
| G | B | G | B | G | B | G | B | G | B | G |
| R | G | R | G | R | G | R | G | R | G | R |
| G | B | G | B | G | B | G | B | G | B | G |
| R | G | R | G | R | G | R | G | R | G | R |
| G | B | G | B | G | B | G | B | G | B | G |
| R | G | R | G | R | G | R | G | R | G | R |
| G | B | G | B | G | B | G | B | G | B | G |

PRODUCING AN EXTENDED DYNAMIC RANGE DIGITAL IMAGE

FIELD OF THE INVENTION

This invention relates to producing an extended dynamic range digital image.

BACKGROUND OF THE INVENTION

An electronic imaging system depends on an electronic image sensor to create an electronic representation of a visual image. Examples of such electronic image sensors include charge coupled device (CCD) image sensors and active pixel sensor (APS) devices (APS devices are often referred to as CMOS sensors because of the ability to fabricate them in a Complementary Metal Oxide Semiconductor process). A sensor consists of a two-dimensional array of individual picture element sensors, or pixels. Regardless of electronic technology employed, e.g., CCD or CMOS, the pixel acts as a bucket in which photoelectrons are accumulated in direct proportion to amount of light that strikes the pixel. Photoelectrons are electrons that are created due to the interaction of light with the pixel and, therefore, represent the signal being detected by the pixel. Thermal electrons are created by the thermal conditions of the device and are generally not related to the light being sensed by the pixel. However, thermal electrons will coexist with photoelectrons within a pixel and are indistinguishable from photoelectrons. Thermal electrons represent a major source of noise in the response of the pixel.

In most commercially available sensors today, the maximum ratio of signal to noise for a pixel is about 100:1 which represents the maximum dynamic range of the pixel. Since the human visual system, at any given moment, is operating with a dynamic range of about 100:1, there is a good correspondence between the human visual system and the image capture capability of the sensor. However, scenes in nature often consist of visual information over a dynamic range that is much greater than 100:1. The human visual system is constantly adapting its brightness sensitivity so that the most visually important information stays within its 100:1 dynamic range capability. However, most electronic image sensors have no such real-time adjustment capability. It is up to the camera's exposure adjustment system to properly regulate the amount of light falling on the sensor. If the exposure adjustment system makes an error, and selects the wrong portion of the scene to capture within the dynamic range of the sensor, the resulting image has either shadows that are too dark or highlights that are too light. In the case where the important parts of a scene consist of visual information over a dynamic range that is greater than 100:1, some of the important parts of a scene will be clipped regardless of the regulation by the exposure adjustment system.

If the dynamic range of the pixel could be increased from 100:1, more scene information could be recorded at capture time and subsequent image processing could properly create an image with the desired rendering. However, the current industry trends in sensor manufacturing are to make pixels smaller and sensors cheaper. The smaller the pixel size, the fewer total photoelectrons it can accumulate. Since the number of thermal electrons accumulated stays roughly the same as the pixel shrinks in size, the overall result is that smaller pixels have smaller dynamic ranges.

U.S. Pat. No. 6,040,858 issued Mar. 21, 2000 to Ikeda provides a complete description of the problem of the limited dynamic range of electronic image sensors. In addition, Ikeda describes methods of extending the dynamic range of an electronic image sensor by capturing multiple image signals with different exposures. These multiple signals are combined by using thresholds that determine which signal is of higher quality at each position in the image signal to form an image signal having extended dynamic range. Ikeda improves upon these methods by describing a method by which these thresholds are determined for each color. Using Ikeda's method, a very high dynamic range can be achieved by combining many images. However, the multiple images must be properly aligned because moving objects in the scene that change location from one image capture to the next introduce artifacts in the final image.

Another way of producing an image with an extended dynamic range is by employing an electronic image sensor that has high sensitivity photosites interspersed with low sensitivity photosites (U.S. Pat. No. 6,943,831 issued Sep. 13, 2005). The difference in sensitivity between the high sensitivity photosites and the low sensitivity photosites is achieved by applying different gains to the two types of photosites. The maximum gain in a conventional electronic image sensor is typically selected to be the highest gain that can be applied while still producing an image that is pleasing and without too much noise. This maximum gain is applied, in the case of the apparatus described in U.S. Pat. No. 6,943,831, to the high sensitivity photosites and a gain that is lower than the maximum gain is applied to the low sensitivity photosites. After a capture, the pixel values generated by the high sensitivity photosites in very dark areas of the image are used to replace the pixel values generated by the low sensitivity photosites in the same areas, and the pixel values generated by the low sensitivity photosites in very light areas of the image are used to replace the pixel values generated by the high sensitivity photosites in the same areas, to form an image with an extended dynamic range. This method requires only one image capture to produce an extended dynamic range image. Therefore, scene object motion does not pose a problem when combining high pixel values with low pixel values. However, since the gain that is applied to the high sensitivity photosites is the same gain that would be applied in a conventional electronic image sensor, it is necessary to employ slow shutter speeds if extremely dark areas of a scene are to be imaged within the extended dynamic range. Images captured with slow shutter speeds tend to be blurrier than those captured with fast shutter speeds.

U.S. Pat. No. 6,864,916 issued Mar. 8, 2005 to Nayar describes another method that extends the dynamic range of an electronic image sensor. Nayar's method includes the utilization of an optical mask with spatially-varying transmittance, thereby forcing the effective response of each photosite in an electronic image sensor to change according to the amount of light impinging upon each photosite. Following Nayar's approach, the photosites of an electronic image sensor are most sensitive when sensing light from a very dark portion of a scene and the photosites of an electronic image sensor are least sensitive when sensing light from a very light portion of a scene. Nayar's approach does mimic the brightness adaptation property of the human eye. However, Nayar's method also requires using both slow shutter speeds, if extremely dark areas of a scene are to be imaged within the extended dynamic range, and a complicated and costly optical mask that cannot be used without first modifying the hardware of current image capture systems.

Thus, there exists a need for generating extended dynamic range images by utilizing conventional electronic image sensors with a reduced amount of images while imaging very dark areas of a scene within the extended dynamic range without using slow shutter speeds.

SUMMARY OF THE INVENTION

It is an object of the present invention to produce digital images of a scene which have extended dynamic range while overcoming one or more of the problems set forth above. Briefly summarized, according to one aspect of the present invention, the invention provides a method of producing a digital image with extended dynamic range, comprising:

a. capturing at least a first resolution digital image of a scene;

b. combining pixels of the first resolution digital image to produce a second digital image that is brighter with lower resolution;

c. identifying dark regions in the first resolution digital image; and d. replacing dark regions in the first resolution image with corresponding regions from the second digital image to thereby provide a digital image with extended dynamic range.

Advantages of the present invention are that extended dynamic range images can be produced with basic changes to the image processing software from a single image capture without having to use slow shutter speeds to capture detail in the dark areas of the scene. Another advantage is that the resulting extended dynamic range image can be seamlessly inserted into a standard image processing chain for final rendering and use.

These and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 3 is a diagram of a digital image produced with a Bayer color filter array; and FIG. 4 is a diagram of a digital image produced with an electronic image sensor with a Bayer color filter array.

DETAILED DESCRIPTION OF THE INVENTION

A digital image is comprised of one or more digital image channels. Each digital image channel is comprised of a two-dimensional array of pixels. Each pixel value relates to the amount of light received by an electronic image sensor corresponding to the geometrical domain of the pixel. For color imaging applications a digital image will typically consist of red, green, and blue digital image channels. Other configurations, such as using cyan, magenta, and yellow image channels, are also practiced. For monochrome applications the digital image consists of one digital image channel. Motion imaging applications can be thought of as a time sequence of digital images. Those skilled in the art will recognize that the present invention can be applied to, but is not limited to, a digital image for any of the above-mentioned applications.

Although the present invention describes a digital image channel as a two-dimensional array of pixel values arranged by rows and columns, those skilled in the art will recognize that the present invention can be applied to mosaic (non-rectilinear) arrays with equal effect. Those skilled in the art will also recognize that, although the present invention describes replacing an original pixel value with processed pixel values, forming a new digital image with the processed pixel values and retaining the original pixel values is also contemplated.

Imaging devices employing electronic image sensors are well known in the art. Therefore, the present description will be directed, in particular, to elements forming part of, or cooperating more directly with, a method in accordance with the present invention. Elements not specifically shown or described herein are selected from those known in the art. Note that as used herein, the term image is a two-dimensional array of pixel values. An image can be a two-dimensional subset of another image. Given the invention as described in the following materials, software not specifically shown, described, or suggested herein, that is useful for implementation of the invention, is conventional and within the ordinary skill in such arts.

Figure 1:
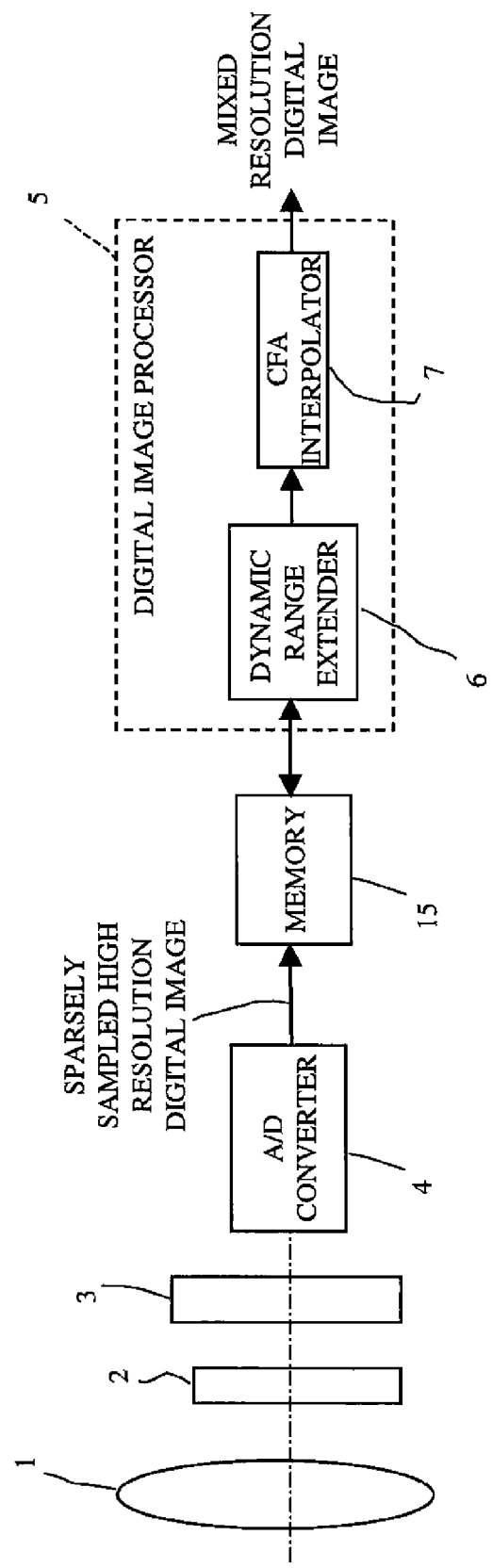
FIG. 1 is a block diagram of a conventional digital still camera system that can employ a conventional sensor and the processing methods of the current invention.

The essential elements employed in the practice of the present invention are shown as a functional block diagram in FIG. 1. Light from an object or scene is incident upon a lens 1 forming a photographic image on an electronic image sensor 3 such as a charged-coupled device (CCD) with a color filter array (CFA). Note that other devices, such as CMOS devices, may be used as the electronic image sensor 3. An optical low pass filter 2, placed between the lens 1 and the electronic image sensor 3, performs a slight blurring of the imaged light in order to reduce the occurrence of aliasing. Each photosite of the electronic image sensor 3 is typically provided with either a red, green, or blue filter, as described by Bayer in commonly assigned U.S. Pat. No. 3,971,065 issued Jul. 20, 1976. The Bayer array is a color filter array in which green filters are located in a checkerboard pattern over the photosites with red and blue filters alternating line by line to fill the interstices of the checkerboard pattern producing twice as many green filter sites as either red or blue filter sites. Note that the method described herein may be easily extended to color filter arrays with different arrangements of the color filters, a different number of color filters, or a different set of color filters.

An A/D converter 4 receives the voltage signal corresponding to the imaged light from the photosites on the electronic imager sensor 3 and produces an image signal corresponding to the voltage signal. Since the electronic image sensor 3 has multiple types of photosites (e.g. red, green, or blue) but produces only a single value at each pixel location, the digital image, as captured, is a sparsely sampled digital image with respect to color. The pixel values of the digital image output from the A/D converter 4 constitute a sparsely sampled digital image having red, green, and blue pixel values at neighboring pixel locations. The sparsely sampled digital image is then stored in memory 15. It is desirable to produce a pixel value corresponding to an exposure for each of the red, green, and blue exposures at each photosite location. The digital image processor 5 receives the sparsely sampled digital image from memory 15, modifies the image signal, and produces a digital image with red, green, and blue values for all pixel locations. It should be noted that the digital image processor 5 can be a programmed personal computer or a microprocessor. The present invention can be practiced in a digital camera, a mobile phone, a film or reflection scanner, or any other device that produces a digital image.

The digital image processor 5 shown in FIG. 1 contains two sub-components: the dynamic range extender 6 and the CFA interpolator 7. The image signal is received from memory 15, in which the sparsely sampled digital image output from the A/D converter 4 is stored, by the dynamic range extender 6. The dynamic range extender 6 processes the sparsely sampled digital image to create a new digital image with extended dynamic range. In the present invention, an extended dynamic range digital image is created from a first digital image by replacing the pixel values in the first digital image where they are very low with processed pixel values from a second digital image that is a lower resolution version of the first digital image. The output from the dynamic range extender 6 is a sparsely sampled third digital image with areas of both first resolution and lower second resolution. The dynamic range extender 6 then transmits the extended dynamic range image to the CFA interpolator 7 where the color values are interpolated to provide red, green and blue color values at each pixel. The purpose of the CFA interpolator 7 is to generate a full description of the color for each pixel location of the sensed photographic image. Any commonly known CFA interpolator can be used, and a description of one CFA interpolator is disclosed in U.S. Pat. No. 5,652,621 issued Jul. 29, 1997 to Adams et al.

Figure 2A:
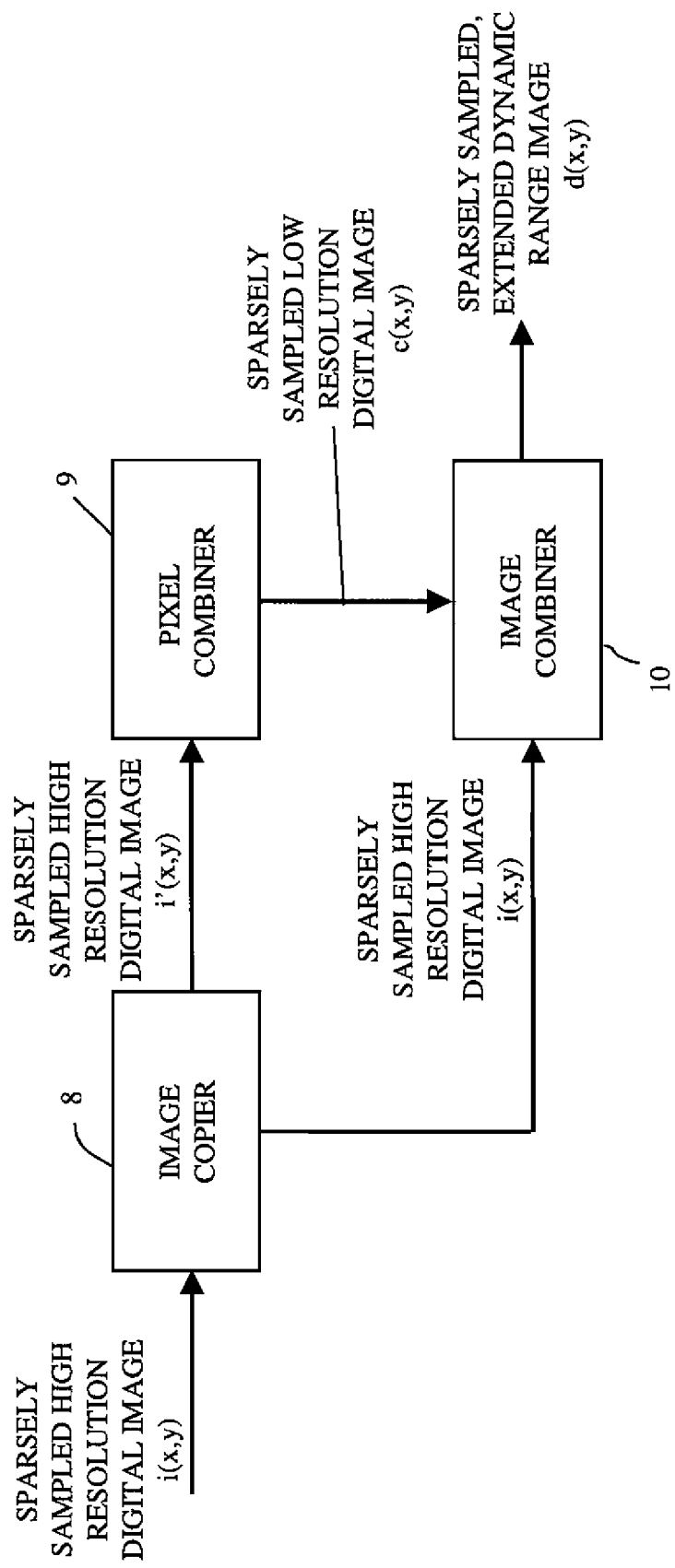
FIG. 2A is a flow diagram which illustrates the operation of a first embodiment of the dynamic range extender of the present invention where a single first resolution digital image of a scene is captured and converted to a digital image with an extended dynamic range.
Figure 4:
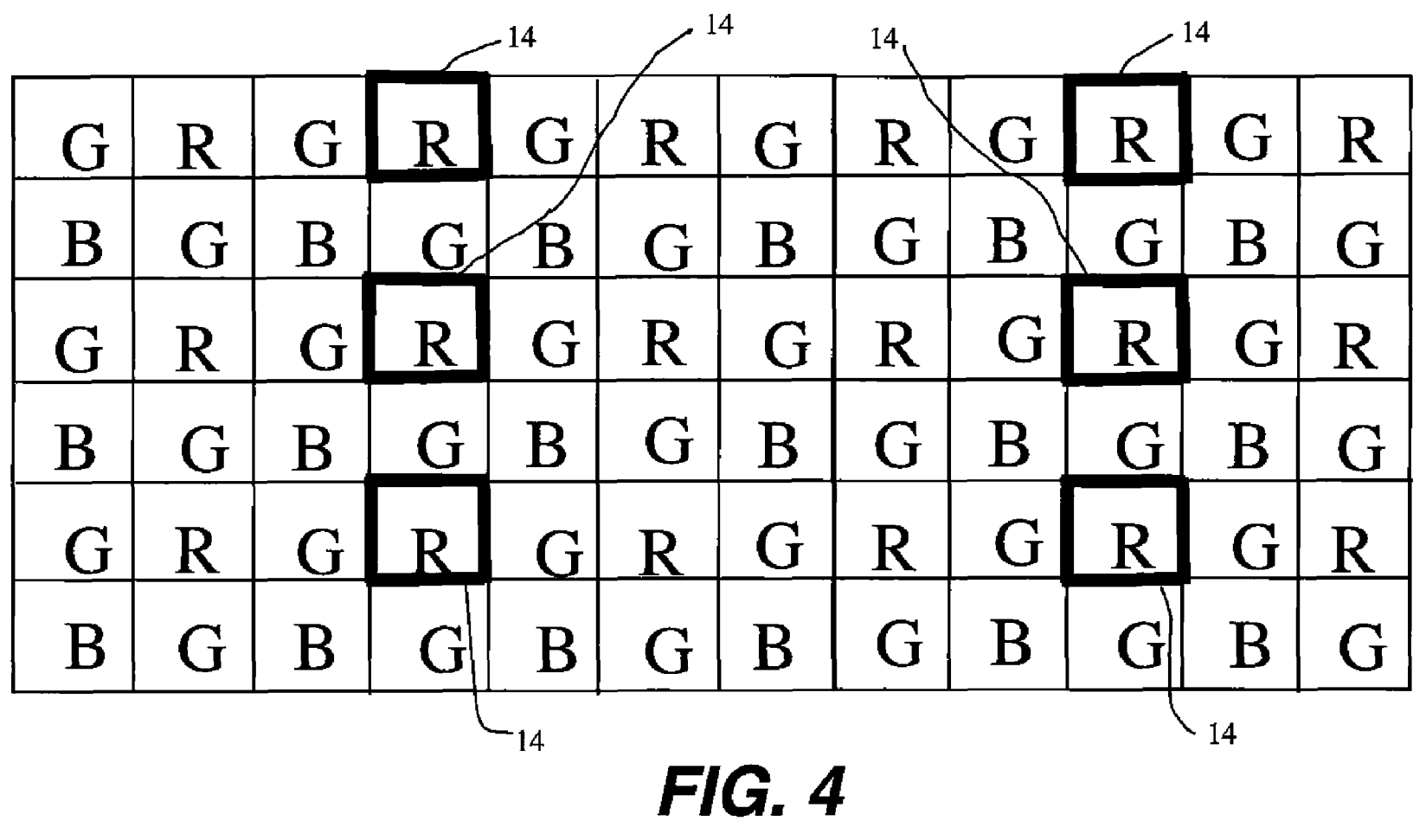

The operation of the dynamic range extender 6 is more fully explained next with reference to FIG. 2A. The sparsely sampled digital image output from the A/D converter 4 is received by the dynamic range extender 6 which extends the dynamic range of the image signal by creating a modified signal having an extended dynamic range. FIG. 2A represents the dynamic range extender in the first preferred embodiment of the present invention in which a single sparsely sampled digital image is captured by the electronic image sensor 3. The sparsely sampled digital image is transmitted from the A/D converter 4 to the digital image processor 5. In this first preferred embodiment, the dynamic range extender 6 comprises an image copier 8, a pixel combiner 9, and an image combiner 10. The image copier 8 makes a copy of the single sparsely sampled digital image as received from the A/D converter 4, wherein the pixel values are now named i(x,y), where (x,y) specifies the indices of the signal location with reference to the electronic image sensor 3, and stores the copy in memory 15. The sparsely sampled digital images produced by the image copier 8 are i(x,y) and its copy i'(x,y) as shown in FIG. 2A. The image i'(x,y) is transmitted to the pixel combiner 9, where each pixel is assigned to a pixel sub-array. A pixel sub-array is defined as an array of pixels that are all of the same type and are located close together. The pixel sub-array that is shown in FIG. 3 is one row high and three columns wide and is composed of red pixels 11, 12, 13. Although the present invention describes a pixel combiner 9 that uses pixel sub-arrays that are one row high and three columns wide and contain three pixels of the same type, those skilled in the art will recognize that the present invention can be applied using pixel sub-arrays of other dimensions or that contain a different amount of pixels, or that contain pixels of different types with equal effect. A pixel sub-array is centered on one of the pixels of the sub-array and each pixel in the image belongs to only one pixel sub-array. The image represented in FIG. 4 has six red sub-arrays that have the same size as the sub-array shown in FIG. 3 and therefore has six red center pixels 14. Not labeled in FIG. 4 are the six blue center pixels and the twelve green center pixels that correspond to the six blue sub-arrays and the twelve green sub-arrays, respectively. Once all the pixels in the image i'(x,y) have been assigned to a sub-array, all the pixels in each sub-array are summed together and the pixels in each sub-array are replaced by the resulting sum value of each sub-array. So, for example, the values of pixels 11, 12, 13 in FIG. 3 would each be replaced by the sum of the values of pixels 11, 12, 13. Since the values of all the pixels in a sub-array are replaced by the same single sum value, the image that results after processing all the sub-arrays of image i'(x,y) as described above is a low-resolution image that has the same number and type of pixels as i(x,y). Therefore, the output of the pixel combiner 9 is a low resolution sparsely sampled digital image, c(x,y). Since the values of all the pixels in a sub-array are replaced by the same single sum value, the image c(x,y) has a higher signal and relatively less noise than i(x,y). For the same reason, the pixels in i(x,y) that have a very low value will result in significantly increased values in the corresponding pixels of c(x,y) and the pixels in i(x,y) that have a high value will result in clipped values for the corresponding pixels of c(x,y).

Both images i(x,y) and c(x,y) are transmitted to the image combiner 10 from memory 15. The image combiner 10 applies a combining function f(.,.) to i(x,y) and c(x,y) to produce an extended dynamic range image d(x,y):

$$d(x,y)=f(i(x,y),c(x,y)). \tag{1}$$

The combining function f(.,.) is such that the value of a pixel in d(x, y) is approximately equal to the value of the corresponding pixel in i(x,y) when the corresponding pixel in i(x,y) has a high value and the value of a pixel in d(x, y) is approximately equal to the value of the corresponding pixel in c(x,y) when the corresponding pixel in i(x,y) has a low value. The combining function f(.,.) is such that the value of a pixel in d(x, y) is equal to some combination of the value of the corresponding pixel in i(x,y) with the corresponding pixel in c(x,y) when the corresponding pixel in i(x,y) has a value that is neither high nor low. A low pixel value corresponds to a dark area of an image and a high pixel value corresponds to a light area of an image. The essential effect of the combining function f(.,.) is to replace dark regions in i(x,y) with corresponding regions from c(x,y) to provide a digital image with extended dynamic range. A dark region is where a majority of the pixels have a digital code value which is less than 50% of the maximum code value. Although those skilled in the art will recognize that there are many combining functions f(.,.) that can be used in the spirit of the invention, an example for this first preferred embodiment is:

$$d(x,y)=(1-e^{wi(x,y)})i(x,y)+(e^{wi(x,y)})c(x,y) \tag{2}$$

where w is a negative constant. The image d(x,y), which is the output of the image combiner 10, is a sparsely sampled extended dynamic range image because the dark areas of the scene that result in very low and noisy pixel values in i(x,y) result in higher and relatively less noisy pixel values in d(x,y). The image d(x,y) is transmitted to the CFA interpolator 7 to generate a full description of the color for each pixel location of the sensed photographic image.

Figure 2B:
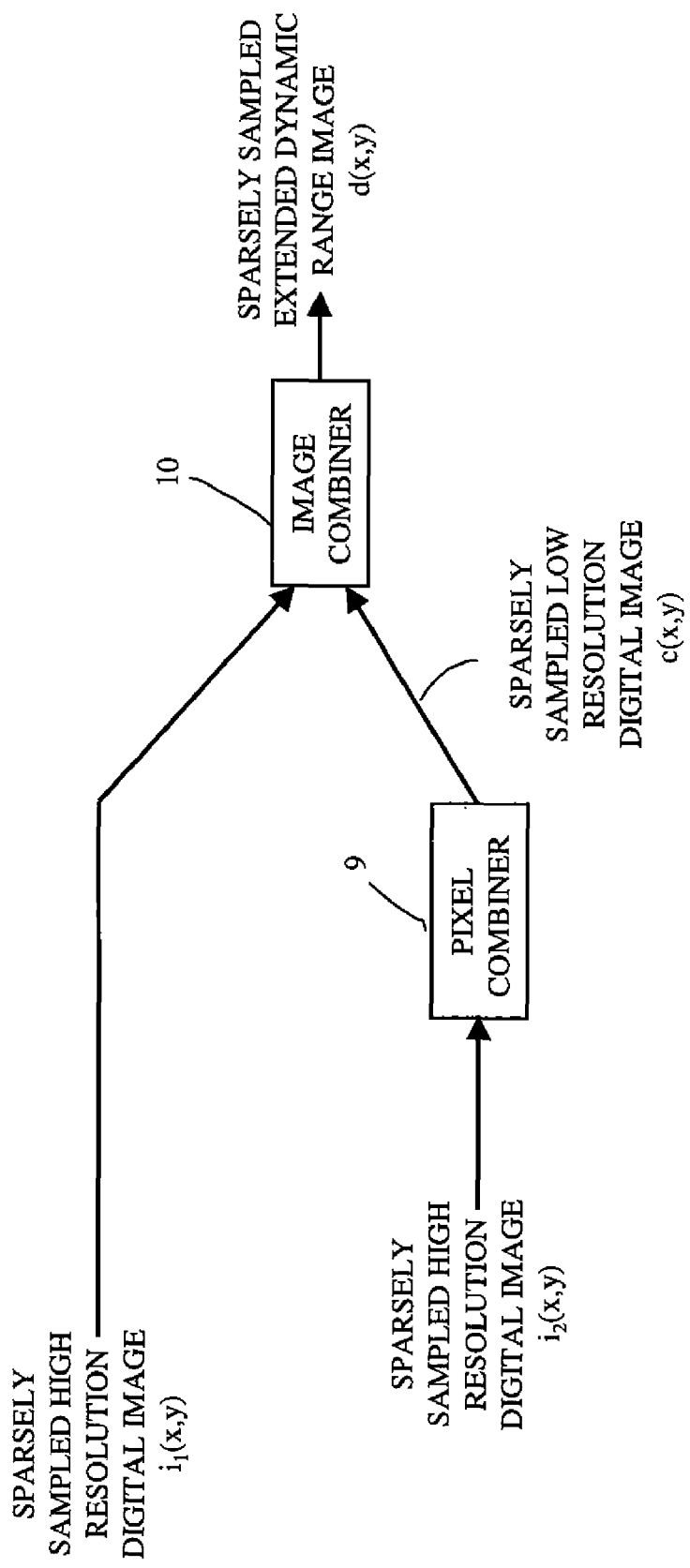
FIG. 2B is a flow diagram which illustrates the operation of a second embodiment of the dynamic range extender of the present invention where two digital images of a scene are captured and used to provide a digital image with an extended dynamic range.

In a second preferred embodiment of the invention, an extended dynamic range image is produced from two or more images. In this second embodiment, the operation of the dynamic range extender 6 is more fully explained in FIG. 2B with reference to FIG. 2A. Referring to FIG. 2B, two sequential digital images are captured by the image sensor 3 and transmitted as sparsely sampled digital images from the A/D converter 4 to memory 15 and then the image processor 5 wherein the dynamic range extender 6 receives the pixel values for the two sparsely sampled digital images as $i_1(x,y)$ and $i_2(x,y)$. In this case, the set of pixels values for the first sparsely sampled digital image $i_1(x,y)$ is transmitted directly to the image combiner 10 whereas the set of pixel values for the second sparsely sampled digital image $i_2(x,y)$ is transmitted to the pixel combiner 9. A set of pixel values for a low resolution sparsely sampled digital image $c(x,y)$, is produced by the pixel combiner 9 from the set of pixel values for the second sparsely sampled digital image $i_2(x,y)$. An extended dynamic range digital image is then produced by the image combiner 10 from the two sets of pixels values $i_1(x,y)$ and $c(x,y)$.

This second preferred embodiment of the invention describes how the second digital image is provided from a second capture of the scene with combined pixels. The charge from same colored pixels can be combined or binned as is well known in the image sensor art. Combining or binning charge from two pixels doubles the signal level, while the noise associated with sampling and reading out the combined signal remains the same, thereby increasing the signal to noise ratio by a factor of two, representing a corresponding two times increase in the photosensitivity of the combined pixels. Alternatively, the digital representations of the light levels at same colored pixels can be summed or averaged. In yet another approach, the voltages corresponding to the measured amounts of charge in same colored pixels can be averaged by first charging capacitors to the voltages produced by the pixels and then connecting the capacitors together to average the voltages, with the capacitors being of equal sizes to perform a simple average or of differing sizes to perform a weighted average. In the case of summing the digital representations of the light levels from two pixels, the resulting signal increases by a factor of two, but the corresponding noise levels from reading the two pixels combine in quadrature, thereby increasing the noise by the square root of two; the resulting signal to noise ratio of the combined pixels therefore increases by the square root of two over the uncombined signals. A similar analysis applies to voltage or digital averaging.

Although the present invention describes a method where the dynamic range extender 6 operates before the CFA interpolator 7, those skilled in the art will recognize that the present invention can be applied to the case where the CFA interpolator 7 operates before the dynamic range extender 6.

It should be noted that while the invention is described for the case of a single image capture and a two image capture, the invention can be used to produce extended dynamic range images in a continuous fashion using sequential images as in the case of video image capture.

The invention has been described in detail with particular reference to certain preferred embodiments thereof, but it will be understood that variations and modifications are effected within the spirit and scope of the invention.

PARTS LIST

| | |
|---|---|
| 1 | Lens |
| 2 | Optical lowpass filter |
| 3 | Electronic image sensor |
| 4 | A/D converter |
| 5 | Digital image processor |
| 6 | Dynamic range extender |
| 7 | CFA interpolator |
| 8 | Image copier |
| 9 | Pixel combiner |
| 10 | Image combiner |
| 11 | A red pixel belonging to the first red sub-array |
| 12 | A red pixel belonging to the first red sub-array |
| 13 | A red pixel belonging to the first red sub-array |
| 14 | A center red pixel |
| 15 | Memory |

The invention claimed is:

1. A method of producing a digital image with extended dynamic range, comprising by using a digital image processor the steps of:
   a. capturing at least a first digital image of a scene having pixels with associated pixel values;
   b. copying the first digital image to provide a second digital image;
   c. assigning the pixels in the second digital image to sub-arrays;
   d. combining the pixel values within each sub-array of the second digital image and replacing the pixel values of the second digital image so that the second digital image has higher pixel values with less noise and lower resolution than the first digital image; and
   e. combining corresponding pixel values of the first digital image and the second digital image to produce a third digital image, including:
      i. using the pixel values in the second digital image when corresponding pixel values in the first digital image are less than 50% of the maximum pixel value; and
      ii. using the pixel values in the first digital image when corresponding pixel values in the first digital image are greater than 50% of the maximum code value whereby the third digital image has extended dynamic range.

2. The method of claim 1 wherein the first digital image is captured and stored in memory and the second digital image is produced from the stored first resolution digital image.

3. The method according to claim 1 wherein the combining step includes the function:

$$d(x,y) = (1-e^{wi(x,y)})i(x,y) + (e^{wi(x,y)})c(x,y)$$

wherein: $d(x,y)$ is the pixel value for the third digital image; $w$ is a negative number; $i(x,y)$ is a pixel value from the first digital image; $c(x,y)$ is a pixel value from the second digital image and $x,y$ is the pixel location in the corresponding image.

4. A method of producing a digital image with extended dynamic range, comprising by using a digital image processor the steps of:
   a. capturing at least a first digital image of a scene having pixels with associated pixel values;
   b. capturing at least a second digital image of a scene having combined pixels and higher associated pixel values with less noise than corresponding pixels in the first digital image; and
   c. combining corresponding pixel values of the first digital image and the second digital image to produce a third digital image, including:
      i. using the pixel values in the second digital image when the corresponding pixel values in the first digital image are less than 50% of the maximum code value; and
      ii. using the pixel values in the first digital image when corresponding pixel values in the first digital image are greater then 50% of the the maximum pixel value so that the third digital image has extended dynamic range.

5. The method of claim 4 wherein the pixel values are combined by binning the charge from two or more same colored pixels, by combining the voltages produced by the two or more same colored pixels, or by first converting the same colored pixel values to digital numbers and then combining the two or more pixel value, or combinations thereof.

6. The method of claim 5 wherein the voltages are combined by first charging capacitors of same colored pixels to the voltages produced by the same colored pixels and then connecting the capacitors together to combine the voltages.

* * * * *